United States Patent
Kim et al.

(10) Patent No.: US 8,230,166 B2
(45) Date of Patent: *Jul. 24, 2012

(54) APPARATUS AND METHOD FOR PROCESSING DATA OF FLASH MEMORY

(75) Inventors: Jin-kyu Kim, Seoul (KR); Min-young Kim, Suwon-si (KR); Song-ho Yoon, Bucheon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 13/188,997

(22) Filed: Jul. 22, 2011

(65) Prior Publication Data
US 2011/0276750 A1 Nov. 10, 2011

Related U.S. Application Data

(63) Continuation of application No. 11/283,376, filed on Nov. 21, 2005, now Pat. No. 8,015,344.

(30) Foreign Application Priority Data

Nov. 19, 2004 (KR) ........................ 10-2004-0095286

(51) Int. Cl.
*G06F 12/00* (2006.01)
(52) U.S. Cl. ................ 711/103; 711/E12.016; 714/766; 714/722; 714/746; 714/753; 714/768; 714/773; 714/758; 714/E11.004; 714/E11.055; 714/E11.098
(58) Field of Classification Search .................... None
See application file for complete search history.

(56) References Cited

U.S. PATENT DOCUMENTS

| | | | |
|---|---|---|---|
| 3,840,862 A | 10/1974 | Ready | |
| 4,617,660 A | 10/1986 | Sakamoto | |
| 4,980,888 A | * 12/1990 | Bruce et al. | ................... 714/718 |
| 5,708,790 A | 1/1998 | White et al. | |
| 5,875,477 A | 2/1999 | Hasbun et al. | |
| 6,000,006 A | 12/1999 | Bruce et al. | |
| 6,014,755 A | 1/2000 | Wells et al. | |
| 6,141,251 A | 10/2000 | Xing | |
| 6,158,004 A | 12/2000 | Mason et al. | |
| 6,275,960 B1 | 8/2001 | Cappelletti et al. | |

(Continued)

FOREIGN PATENT DOCUMENTS
EP 1100205 A2 5/2001
(Continued)

OTHER PUBLICATIONS

"Error Control Coding: Protecting digital information through the bumpy course of transmission and storage"—Behnam Kamali, IEEE Potentials: New York, NY, US (Apr. 1, 1995) vol. 14 No. 2 pp. 15-19.

(Continued)

*Primary Examiner* — Edward Dudek, Jr.
*Assistant Examiner* — Christopher Birkhimer
(74) *Attorney, Agent, or Firm* — Sughrue Mion, PLLC

(57) ABSTRACT

An memory device including a data region storing a main data, a first index region storing a count data, and a second index region storing an inverted count data, where the data region, the first index region, and the second index region are included in one logical address.

19 Claims, 8 Drawing Sheets

U.S. PATENT DOCUMENTS

| | | |
|---|---|---|
| 6,374,324 B2 | 4/2002 | Han |
| 6,767,695 B2 | 7/2004 | Kelley et al. |
| 6,910,169 B2 | 6/2005 | Sharma |
| 2003/0046483 A1 | 3/2003 | Moschopoulos |
| 2003/0177433 A1 | 9/2003 | Kikuchi et al. |
| 2004/0044933 A1 | 3/2004 | Jeddeloh |
| 2004/0177216 A1* | 9/2004 | Asari et al. ................. 711/103 |
| 2005/0013154 A1 | 1/2005 | Honda et al. |

FOREIGN PATENT DOCUMENTS

| | | | |
|---|---|---|---|
| JP | 56-107399 A | | 8/1981 |
| JP | 01181141 A | * | 7/1989 |
| JP | 10134586 A | | 5/1998 |
| JP | 200099405 A | | 4/2000 |
| JP | 2001-273198 A | | 10/2001 |
| JP | 2003187585 A | | 7/2003 |
| JP | 1020040042478 A | | 5/2004 |
| JP | 01181141 A | | 7/2011 |
| WO | 9932977 A1 | | 7/1999 |
| WO | 2004/031966 A1 | | 4/2004 |

OTHER PUBLICATIONS

Office Action issued Aug. 24, 2010, in counterpart Japanese Application No. 2007-542897.

Canadian Office Action issued on Oct. 25, 2010 in the corresponding Canadian Patent Application No. 2,587,724.

Tyson, J. "How RAM Works", HowStuffWorks, retrieved online, pp. 1-8.

Japanese Office Action issued in corresponding Japanese patent application No. 2007-542897 on May 17, 2011.

John Daintith, ("Hamming Weight"), HighBeam Research, Inc., 2004, pp. 1-3, http://www.encyclopedia.com/doc/1O11-Hammingweight.html.

IBM Technical Disclosure Bulletin, "Memory Error Detection Using Error Correction Code Hardware", Jan. 1986, vol. 28, Issue 8, pp. 1698-1699.

IBM Technical Disclosure Bulletin, "Inverted ECC to Flag Unreliable Data", Aug. 1982, vol. 25, Issue 3B, pp. 16-13-1614.

Rene Martinez, "ECC", Jul. 2001, pp. 1 2 5, http://searchnetworking.techtarget.com/sDefinition/0,,sid7_gci212028,00.html.

Francesco Balena, ("BitCount-The Number of "1" Bits in a Number"), Apr. 1999, pp. 1-2, www.devx.com/vbthemax/Tip/18912.

Dean Kent, ("Parity and ECC-How They Work"), Jun. 2000, pp. 1-4, http://www.realworldtech.com/page.cfm?ArticleID=RWT061300000000.

* cited by examiner

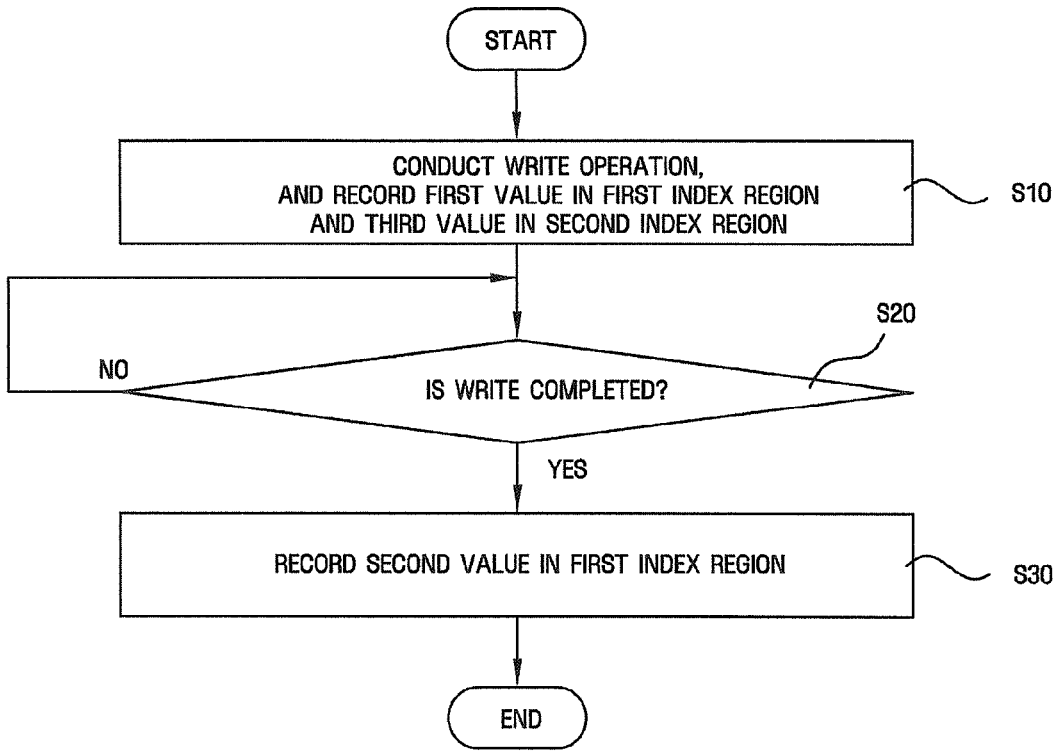
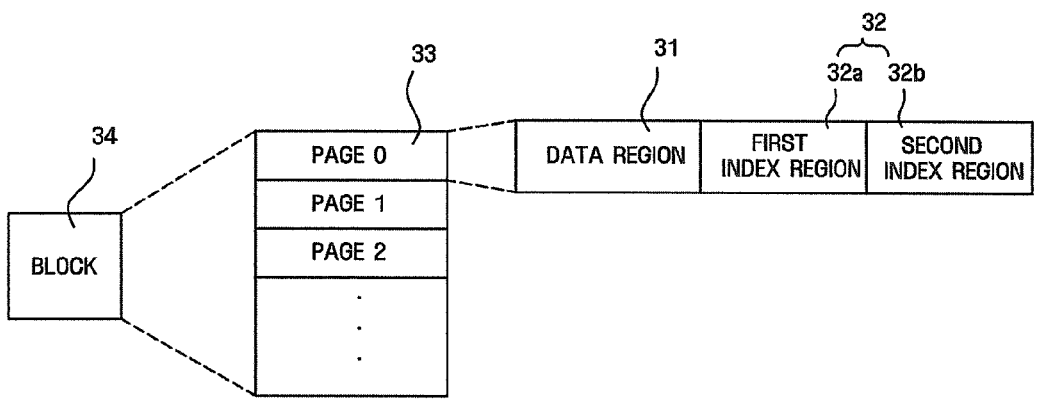

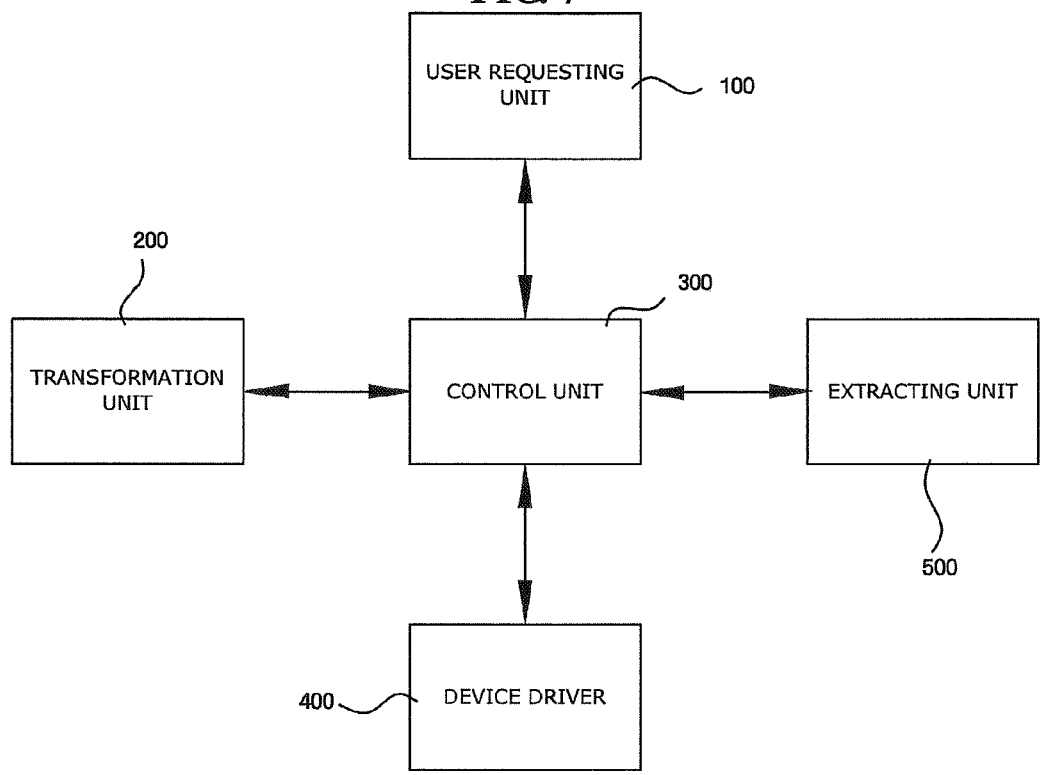
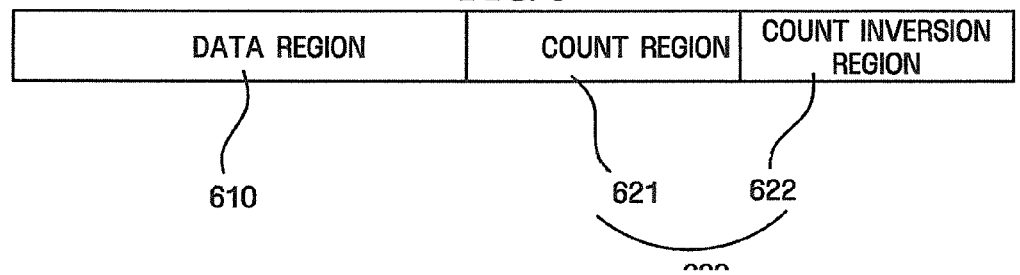

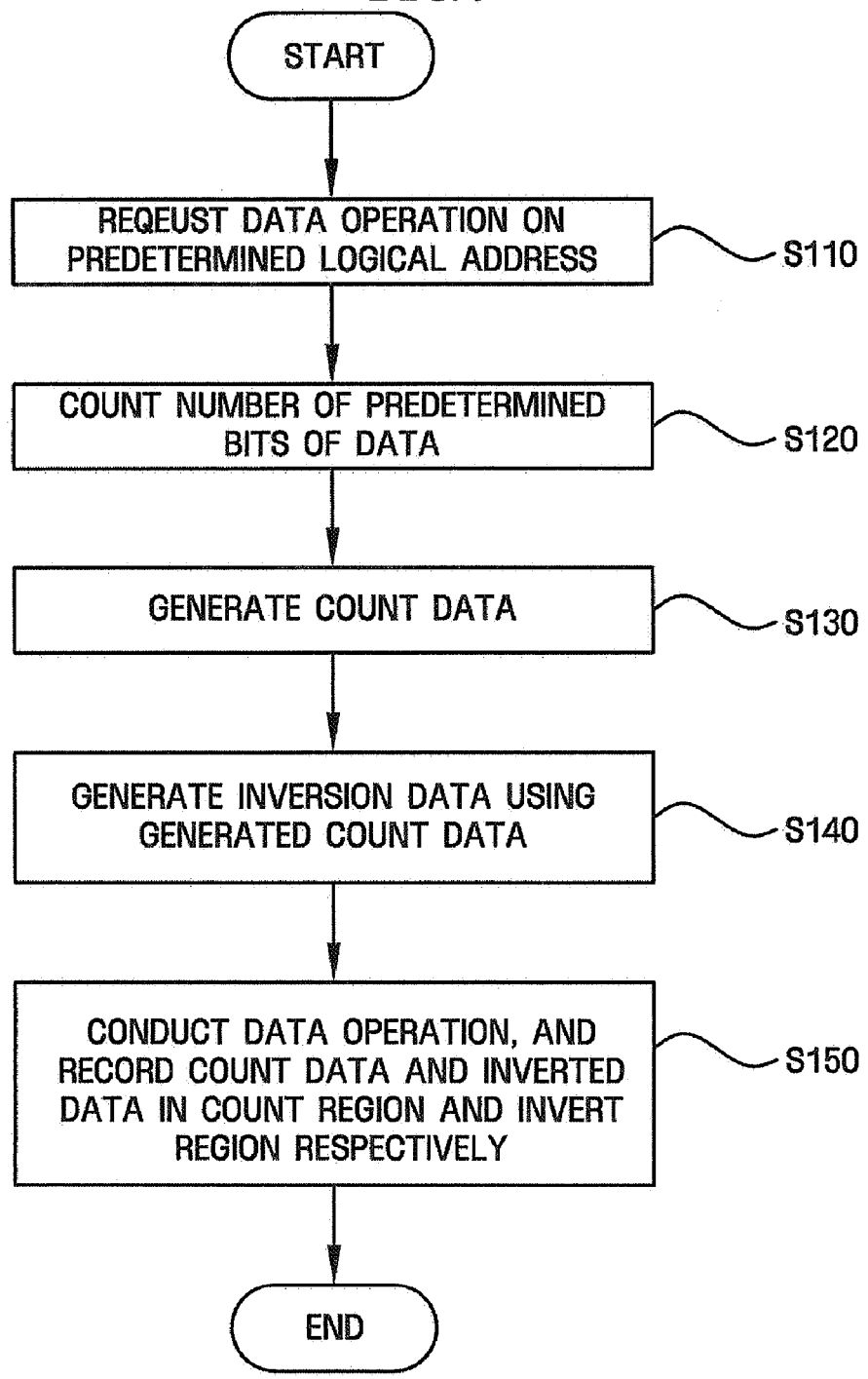

APPARATUS AND METHOD FOR PROCESSING DATA OF FLASH MEMORY

CROSS-REFERENCE TO RELATED APPLICATION

This application is a continuation application of U.S. application Ser. No. 11/283,376 filed Nov. 21, 2005, which claims priority from Korean Patent Application No. 10-2004-0095286 filed on Nov. 19, 2004 in the Korean Intellectual Property Office, the entire disclosure of which is incorporated herein by reference.

BACKGROUND OF THE INVENTION

1. Field of the Invention

Apparatuses and methods consistent with the present invention relate to processing flash memory data. More particularly, the present invention relates to an apparatus and a method for processing data of a flash memory that is capable of easily determining the validity of the data.

2. Description of Related Arts

As a storage medium to store and process data, non-volatile memories are frequently used in embedded systems such as home electronic appliances, communication apparatuses and set-top boxes.

Among the non-volatile memories, flash memories are mainly used. A flash memory is a non-volatile storage device capable of electrically writing, rewriting and deleting data. As compared to a storage medium based on a magnetic disk, the flash memory needs less power and its access time is the same as a hard disk. Further, since the flash memory is compact in size, it is suitable for portable devices.

To rewrite data that was recorded in flash memory, it is necessary to delete the whole block in which the concerned data is recorded since the flash memory is a hardware unit.

Inconsistent units of writing and deleting data on the flash memory may degrade performance thereof. To prevent this degradation, a logical address and physical address concept was introduced.

The logical address refers to an address used when a user conducts a predetermined data operation on a flash memory through a predetermined user program, and the physical address refers to an address used when the predetermined data operation is actually conducted in the flash memory.

Generally, flash memory is classified into small block flash memory and large block flash memory. In the small block flash memory, a logical operation unit and a physical operation unit are identical, whereas the physical operation unit is larger than the logical operation unit in the large block flash memory.

FIGS. 1A and 1B illustrate schematic constructions of general small block flash memory and large block flash memory.

In a small block flash memory, a sector 11, which is a logical operation unit, is identical to a page 12, which is a physical operation unit, as illustrated in FIG. 1A.

In a large block flash memory, a page 22 is formed by collecting at least one sector, as illustrated in FIG. 1B.

A flash memory-based system may suffer from unexpected interruption of power supply because of an inherent property in an application field thereof. Accordingly, it is necessary to provide for interruption of the power supply while the flash memory is in operation.

Specifically, two cases where predetermined data is written in a flash memory and deleted from the flash memory will be described. When the power supply is interrupted while predetermined data is being written in a flash memory, a part of the data is written in the flash memory, but another part thereof may not be written. When the power supply is interrupted while predetermined data is being deleted from the flash memory, a part of the data is deleted from the flash memory, but another part thereof may not be deleted.

A variety of methods to determine the validity of flash memory data have been proposed in order to provide for unexpected interruption of the power supply before data operations such as writing or deleting are completed.

FIG. 2 illustrates data write operations in a flash memory according to the conventional art.

As illustrated therein, in order to write data in a predetermined sector of the flash memory, it is first determined whether space is available in the relevant sector. When space is available, a write operation is conducted and at the same time a predetermined value is recorded in a predetermined index region corresponding to the sector in which the data is written (S10).

In detail, as illustrated in FIG. 3, a flash memory comprises a single block 34 consisting a plurality of pages 33, each page composed of data region 31 and an index region 32. The index region 32 may be further divided into a first index region 32a to indicate the progress of a write operation, and a second index region 32b to indicate the progress of a delete operation. At this time, a first value and a third value are recorded in the first index region 32a and the second index region 32b, respectively.

When the data region 31 consists of a plurality of sectors as illustrated in FIG. 4, the first index region 32a is constructed on a sector basis. The second index region 32b is also constructed on a sector basis.

When the write operation is completed (S20), a second value to indicate completion of the write operation is recorded in the first index region 32a (S30).

For example, as the write operation begins, a first value "0xFE" is recorded in the first index region 32a, and a third value "0x00" is recorded in the second index region 32b. When the write operation is finished, a second value "0xFC" is recorded in the first index region 32a.

At this time, when the values recorded in the first index region 32a and the second index region 32b are initial values, for example, "0xFF," it is determined that data writing is possible. As the case may be, even when the value of the data region 31 is "0xFF," it is determined that data writing is possible. Specifically, when a delete operation is conducted in the flash memory, all the bits are changed to 1. Thus, when all the bits are 1, that is, "0xFF," the flash memory becomes available for data writing.

FIG. 5 illustrates a method of determining the validity of data written through the write operation of FIG. 2.

As illustrated, it is first determined whether values recorded in the first index region 32a and the second index region 32b are normal (S40).

Specifically, when the values recorded in the first index region 32a and the second index region 32b refer to the second value described above, it is determined that the values recorded in the first and the second index regions 32a and 32b are normal.

If the values are determined to be normal, data written in the relevant sector is determined to be valid (S50). If not normal, they are determined to be not valid (S60).

However, the conventional method of determining the validity of data requires two write operations in order to determine the validity of data written in the relevant sector when writing the data. That is, a first write operation to record data in the data region and to record a first value in the first index region 32a and a third value in the second index region, and a second write operation to record the second value again in the first index region.

Since two write operations have to be conducted, this may cause degradation in the performance of the write operation.

In addition, when the power supply is interrupted while an operation to delete data from the flash memory is conducted, a part of the data is deleted from the data region 31 described above, but the values of the first and the second index regions 32a and 32b are not deleted. Thus, invalid data may be determined to be valid, through the values recorded in the first and the second index regions 32a and 32b. In other words, if power supply is interrupted while the delete operation is being conducted and valid data is recorded in the data region 31 as shown in FIG. 6A, the first value of the first index region 32a, "0xFC," and the third value of the second index region 32b, "0x00," remain unchanged, although the data of the data region 31 is not valid any longer as shown in FIG. 6B. For this reason, there is a problem where invalid data is determined to be valid.

Korean Unexamined Patent Publication No. 2004-0042478 discloses a flash memory, access apparatus and method using the flash memory which is capable of storing and updating mapping information of a delete operation, to thereby prevent generation of this error. However, this invention still has difficulty determining the validity of data when errors occur in the write operations to be conducted to update the mapping information.

SUMMARY OF THE INVENTION

In accordance with an aspect of the present invention, there is provided an apparatus and method of processing flash memory data, capable of easily determining validity of the data, when power supply is interrupted while a predetermined data operation is being conducted in the flash memory.

The present invention will not be limited to the technical objects described above. Other objects not described herein will be more definitely comprehended by those in the art from the following detailed description.

According to an aspect of present invention, there is provided a nonvolatile memory device including a data region storing a main data, a first index region storing a count data, and a second index region storing an inverted count data, wherein the data region, the first index region and the second index region are included in one logical address.

According to another aspect of present invention, there is provided a method of programming a data into a nonvolatile memory device including writing a main data into a data region into the nonvolatile memory device, writing a count data into a first index region, and writing an inverted count data into a second index region, wherein the data region, the first index region and the second index region are included one logical address.

According to a further aspect of the present invention, there is provided an apparatus for controlling a nonvolatile memory device including a control unit recording a main data, a count data and an inverted count data into at one physical address into the nonvolatile memory device corresponding a logical address, wherein the count data is the number of predetermined bits of the main data, and the inverted count data is transformed through a predetermined transformation from the count data.

BRIEF DESCRIPTION OF THE DRAWINGS

The above and other aspects of the present invention will become better understood with regard to the following description of the exemplary embodiments given in conjunction with the accompanying drawings, in which:

FIG. 2 is a diagram illustrating write operations in a flash memory according to the conventional art;

FIG. 3 is a diagram illustrating a data region and an index region of a general flash memory;

FIG. 7 is a diagram illustrating an apparatus for processing flash memory data according to an exemplary embodiment of the present invention;

FIG. 8 is a diagram illustrating a data region and an index region according to an exemplary embodiment of the present invention;

FIG. 9 is a diagram illustrating a method of generating count data and inverted data according to an exemplary embodiment of the present invention;

DETAILED DESCRIPTION OF THE INVENTION

Figure 1A:
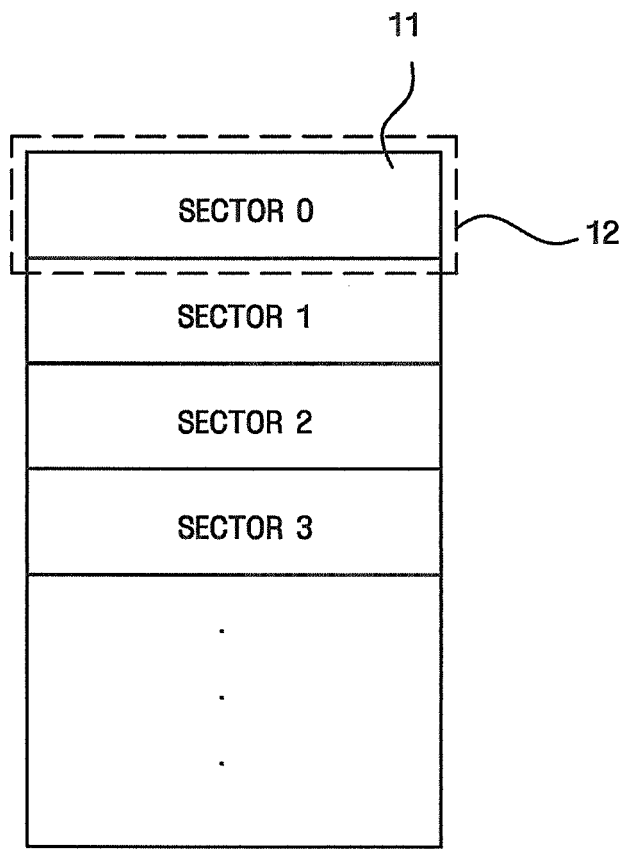
FIG. 1A is a diagram illustrating a construction of a general small block flash memory.
Figure 1B:
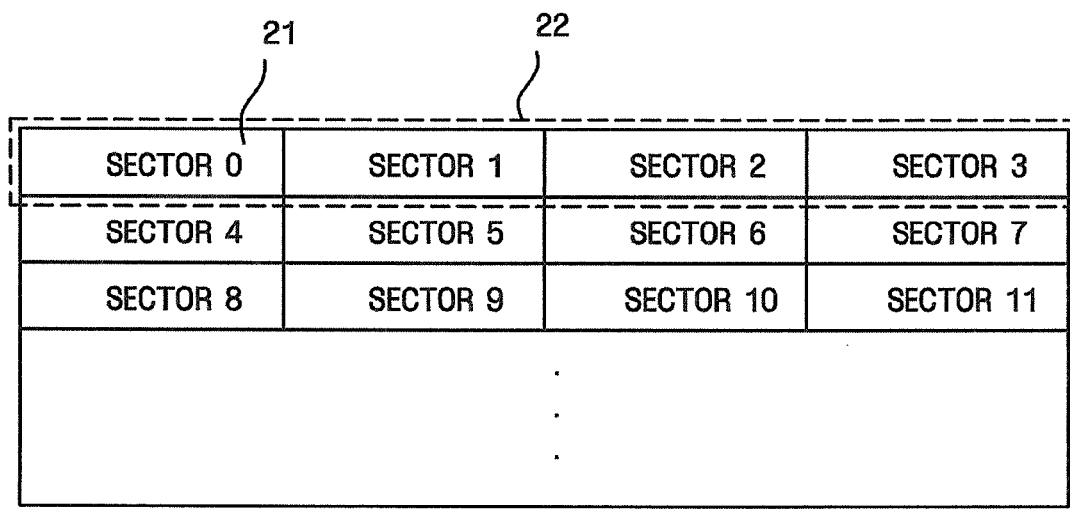
FIG. 1B is a diagram illustrating a construction of a general large block flash memory.
Figure 4:
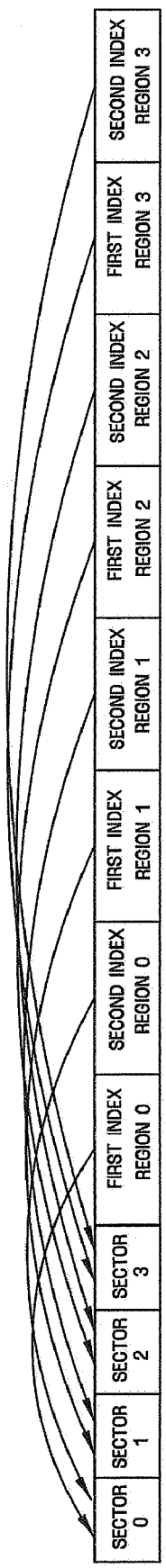
FIG. 4 is a diagram illustrating the index region classified on a sector basis and included in the data region of FIG. 3.
Figure 5:
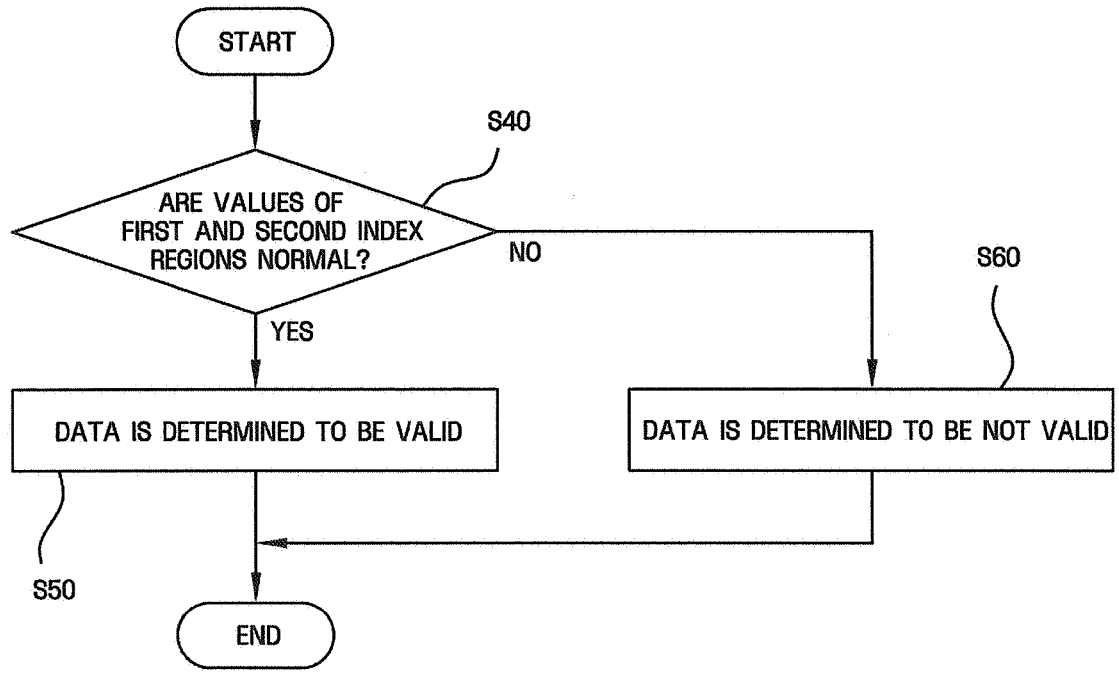
FIG. 5 is a diagram illustrating data validity determination of a flash memory according to the conventional art.
Figure 6A:
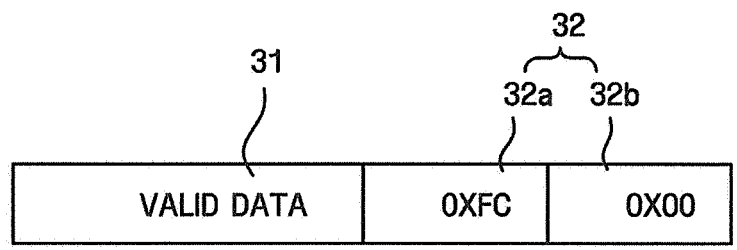
FIG. 6A is a diagram illustrating a data region in which valid data is recorded, and an index region according to the conventional art.
Figure 6B:
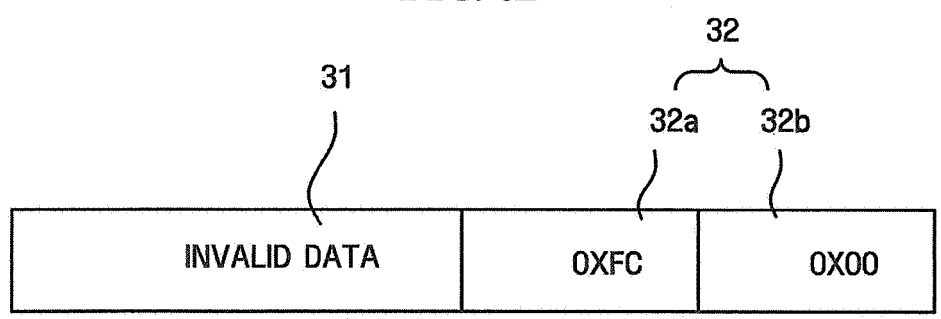
FIG. 6B is a diagram illustrating a data region in which invalid data is recorded and an index region according to the conventional art.

Specific matters of exemplary embodiments of the present invention will be covered by the detailed description and drawings.

Advantages and features of the present invention and methods of accomplishing the same may be understood more readily by reference to the following detailed description of the exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will be described hereinafter with reference to block diagrams or flowchart illustrations of an apparatus and a method of processing flash memory data according to an exemplary embodiment thereof. It will be understood that each block of the flowchart illustrations, and combinations of blocks in the flowchart illustrations can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the block diagrams may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order depending upon the functionality involved.

An exemplary embodiment of the present invention will be described with reference to the accompanying drawings.

Generally, a flash memory is roughly classified into a small block flash memory and a large block memory.

In the small block flash memory, a logical operation unit and a physical operation unit are identical, whereas the physical operation unit is larger than the logical operation unit in the large block flash memory.

The logical operation unit is commonly called a sector, which is a data write operation unit when a user writes data in the flash memory through a predetermined user program.

The physical operation unit is commonly called a page, which is an actual data operation unit in a flash memory, for example, data write.

The logical operation unit and the physical operation unit are not limited to sectors and pages, and may be embodied in different forms according to the apparatuses.

When a conventional data operation is conducted on a sector, there is a process of recording a predetermined value on an index region corresponding to a predetermined sector to determine validity of data after the data operation is completed. However, this recording process required after the data operation may degrade the overall write performance.

Further, since a portion corresponding to the index region is used, in addition to the sector, more storage space is consumed.

Accordingly, this exemplary embodiment relates to a data processing apparatus of a flash memory that is capable of reducing the number of operations and the capacity required for determining the validity of data when conducting data operations in the flash memory, and at the same time easily determining the data validity of each logical address. FIG. 7 schematically illustrates a construction of a data processing apparatus of a flash memory according to the present invention.

As illustrated, the data processing apparatus of the flash memory comprises a user requesting unit 100 by which a user requests a data operation to be performed on the flash memory using a predetermined logical address, a transformation unit 200 to transform a logical address into a physical address, a control unit 300 to conduct a predetermined data operation in the flash memory through a device driver 400 to control operations of the flash memory according to the transformed physical address, and recording count data for recording the number of predetermined bits of data present in the logical address, as a result of conducting the data operation on an index region to indicate the validity of the data present in the logical address, and an extracting unit 500 to extract data of the index region when determining the validity of data present in the logical address.

As illustrated in FIG. 8, the flash memory according to the present invention comprises a data region 610 including at least one logical address, on which a data operation is conducted, and an index region 620 recording therein count data for recording the number of predetermined bits of data present in the data region 610, as a result of conducting the data operation. The predetermined bits of data may be "1" or "0", either of which is selected according to the case.

The index region 620 comprises a count region 621 recording therein the count data recording the number of predetermined bits, and an inversion region 622 recording therein inverted count data. The index region 620 may be constructed based on a write unit of data present in the data region 610. The index region 620 may be positioned next to a region on which one write time of data is completed, on the data region 610. For example, when 10 bytes of data are written in the data region 610, the index region 620 is positioned after the 10 bytes. When 504 bytes of data are recorded in the data region 610, the index region 620 is positioned after the 504 bytes. However, the position of the index region 620 is not fixed next to the data region.

The inversion data refers to count data recorded in the count region 621 and transformed through a predetermined transformation. In the present embodiment, it has been described that a one time complement transformation is conducted on the data recorded in the logical address, by way of example, but the present invention is not limited to this. All the transformation methods making the inverted data identical to data recorded in the logical address, e.g., two time complement transformation, may be adopted. When the inverted data is a one time complement of the count data, the inverted data is '0101' if the count data is '1010.'

The control unit 300 may determine the validity of data present in the data region 610, through the count data and the inverted data recorded in the index region 620. At this time, the count data and the inverted data are extracted by the extracting unit 500, and the control unit 300 may determine the validity of the data present in the data region 610, after determining the validity of the count data.

The control unit 300 inversely transforms the inverted data to thereby determine whether it is identical to the count data, and may determine the validity of the count data depending upon the result of determination. The reason for determining the validity of the count data is that the count data should first be confirmed prior to determining the data validity.

Thereafter, the control unit 300 may determine that the data is valid by comparing the number of predetermined bits according to the count data and the number of concerned bits of the data present in the data region 610; the data is considered not valid when they are not identical.

This may reduce the number of necessary operations, as compared with a case where a predetermined value is recorded in an index region corresponding to a sector after a write operation.

Hereinafter, a data processing method of a flash memory according to the present invention will be described.

FIG. 9 illustrates a method of generating count data and inverted data when conducting data operations of a flash memory according to an exemplary embodiment of the present invention.

As illustrated, a user requests a data operation on a predetermined logical address, using the user requesting unit 100 (S110).

The control unit 300 counts the number of predetermined bits of data used in the data operation prior to conducting the data operation (S120), and generates count data detailing the number of predetermined bits (S130); of course, the bits are either "1" or "0".

The control unit 300 generates inverted data of the generated count data (S140).

Specifically, when a user requests a data operation, the concerned data is loaded into a buffer, and the control unit 300 counts the number of predetermined bits in the loaded data. At this time, the control unit 300 generates inverted data again using the count data. The control unit 300 also loads the generated count data and the inverted data into the buffer.

Then, the control unit 300 conducts a data operation and at the same time records the generated count data and inverted data in the count region 621 and the inversion region 622 respectively (S150). In other words, the control unit 300 records the data loaded into the buffer, the count data and the inverted data in the data region 610, the count region 621 and the inversion region 622 respectively.

The method of generating count data and inverted data according to an exemplary embodiment of the present invention shown in FIG. 9 will be described in more detail with reference to FIGS. 10A and 10B.

Figure 10A:
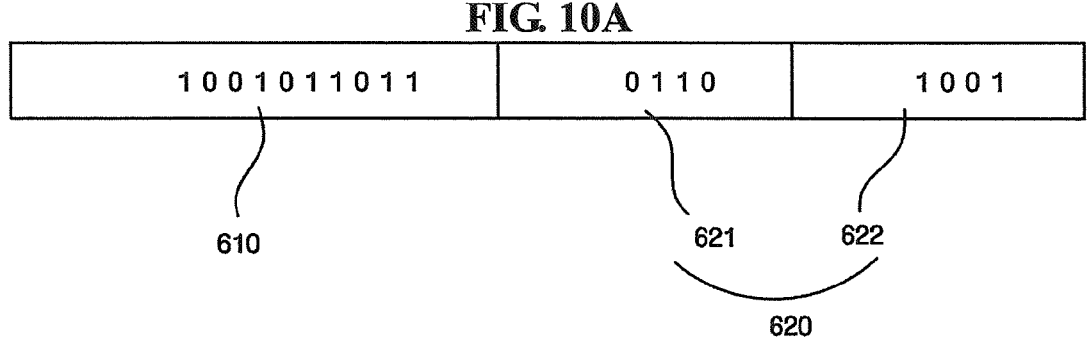
FIG. 10A is a diagram illustrating count data to count the number of "1" bits and inverted data according to an exemplary embodiment of the present invention.
Figure 10B:
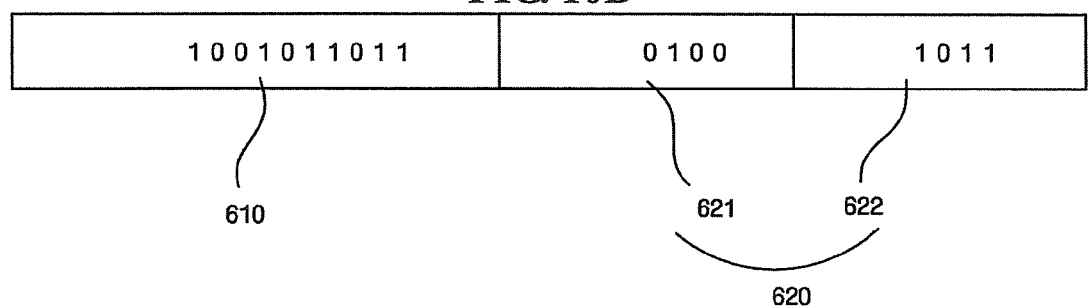
FIG. 10B is a diagram illustrating count data to count the number of "0" bits and inverted data according to an exemplary embodiment of the present invention.

When data such as "1001011011" is present in the data region 610 due to a predetermined data operation, the control unit 300 counts the number of "1" bits and then records "0110" in the count region 621 as illustrated in FIG. 10A. The inverted data is a one complement of the count data "1001", that is, it is "0110", and it is recorded in the inversion region 622. If the control unit counts the number of "0" bits, "0100" is recorded in the count region 621 as shown in FIG. 10B, and "1011", which is a one complement of "0100," is recorded in the inversion region 622.

Figure 11:
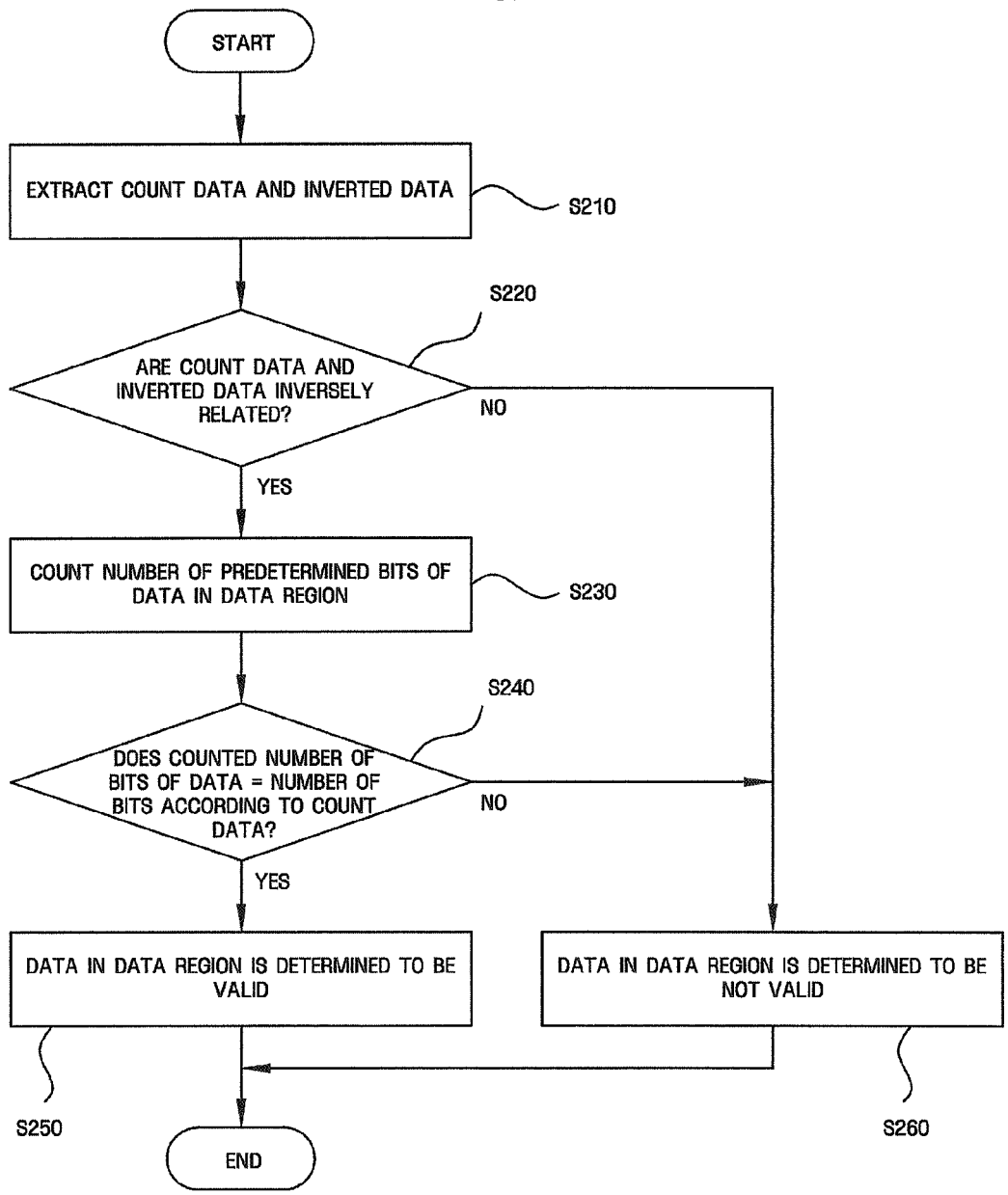
FIG. 11 is a diagram illustrating a method of determining the validity of data written in a flash memory according to an exemplary embodiment of the present invention.

FIG. 11 illustrates a method of determining the validity of data present in the data region 610 based on count data and inverted data recorded through the method of FIG. 9 described above.

As illustrated, the extracting unit first extracts count data and inverted data from the count region 621 and the inversion region 622 respectively (S210).

Then, the control unit 300 determines whether the extracted count data and inverted data have an inverse relation (S220). That is, the inverse data is inversely transformed and compared with the count data to thereby determine whether they are identical. They are determined to have an inverse relation when they are identical, but they are determined to have no inverse relation when they are not identical. When the count data and the inverted data are not inversely related, the validity of the data of the data region 610 cannot be determined, and thus, data present in the data region 610 is determined to be invalid.

When it is determined that the count data and the inverted data have an inverse relation, the control unit 300 counts the number of predetermined bits of the data present in the data region 610 (S230).

It is determined whether the data counting the number of predetermined bits of the data present in the data region 610 and the extracted count data are identical in step (S240).

When it is determined that the number of predetermined bits of the data present in the data region 610 and the number of predetermined bits according to the extracted count data are identical, the data present in the data region 610 is determined to be valid (S250).

When it is determined that the number of predetermined bits of the data present in the data region 610 and the number of predetermined bits according to the extracted count data are not identical, or the above-described count data and the inverted data are not inversely related, the data present in the data region 610 is determined to be not valid (S260).

In the embodiments of the present invention described above, a "part" indicates a software component or a hardware component such as a field-programmable gate array (FPGA) or an application-specific integrated circuit (ASIC). The module performs a particular function and may be included in an addressable storage medium or it may be configured to play one or more processors. Accordingly, modules may include components such as software components, object-oriented software components, class components, and task components, processes, functions, attributes, procedures, subroutines, segments of a program code, drivers, firmware, microcode, circuits, data, databases, data structures, tables, arrays, and parameters. Components and features provided by the modules may be combined into a smaller number of components and features, or they may be divided into a greater number of components and features.

As described above, the data processing apparatus and method of a flash memory according to the present invention have one or more effects described below.

First, the precision of inspecting data that may be compromised is enhanced; that is, data that is in the process of being written or deleted becomes different from the original data because of interruption of the power supply.

Second, since a predetermined value is not recorded after a write operation in an index region corresponding to a predetermined logical address, the number of operations necessary for a data write to determine validity of the data is reduced, thereby enhancing the overall performance of the flash memory.

While the data processing apparatus and method of a flash memory according to the present invention has been described with respect to the accompanying drawings, it will be apparent to those skilled in the art that various changes and modifications may be made without departing from the spirit and scope of the invention as defined in the following claims. Further it should be understood that with respect to the implication and scope of the claims, any modification or modified types of the invention derived from the equivalent concept thereof are all included in the scope of the present invention.

What is claimed is:

1. A nonvolatile memory device comprising:
   a data region storing a main data;
   a first index region storing a count data;
   a second index region storing an inverted count data; and
   a control unit that compares the count data to an inverse of the inverted count data and determines that the count data is valid if the inverse of the inverted count data is equal to the count data,
   wherein the count data and the inverted count data are written to a location of the nonvolatile memory device corresponding to one logical address at a same time when a data operation is conducted on the main data.

2. The device of claim 1, further comprising:
   a memory block including at least one page, wherein the at least one page corresponds to the one logical address.

3. The device of claim 1, wherein the inverted count data is transformed through a predetermined transformation from the count data.

4. The device of claim 3, wherein the first index region is next to the data region.

5. The device of claim 4, wherein the second index region is next to the first index region.

6. The device of claim 5, wherein count data is the number of predetermined bits of the main data.

7. The device of claim 6, wherein the number of the predetermined bits is the number of bits having value of "1" or the number of bits having value of "0".

8. A method of programming a data into a nonvolatile memory device, comprising:
   writing a main data into a data region into the nonvolatile memory device;
   writing a count data into a first index region;
   writing an inverted count data into a second index region; and
   comparing the count data to an inverse of the inverted count data and determining that the count data is valid if the inverse of the inverted count data is equal to the count data,
   wherein the count data and the inverted count data are written to a location of the nonvolatile memory device corresponding to one logical address at a same time of the writing the main data.

9. The method of claim 8, wherein the one logical address corresponds to at least one page included a memory block.

10. The method of claim 8, wherein the first index region is next to the data region.

11. The method of claim 9, wherein the second index region is next to the first index region.

12. The method of claim 8, wherein the count data is the number of predetermined bits of the main data.

13. The method of claim 9, wherein the number of the predetermined bits is the number of bits having value of "1" or the number of bits having value of "0".

14. The method of claim 8, the inverted count data is transformed through a predetermined transformation from the count data.

15. An apparatus for controlling a nonvolatile memory device, comprising:
   a control unit recording a main data, a count data and an inverted count data into at least one physical address into the nonvolatile memory device corresponding to a logical address,
   wherein the count data is the number of predetermined bits of the main data, and the inverted count data is transformed through a predetermined transformation from the count data, and
   wherein the control unit compares the count data to an inverse of the inverted data and determines that the count data is valid if an inverse of the inverted data is equal to the count data.

16. The apparatus of claim 15, wherein the control unit determines that the main data at the logical address is valid if the count data is valid and if the number of predetermined bits at the logical address is equal to the count data.

17. The apparatus of claim 15, wherein the number of the predetermined bits is the number of bits having value of "1" or the number of bits having value of "0".

18. The apparatus of claim 15, wherein the main data is recorded in data region, the count data is recorded in first index region, and the inverted count data is recorded in second index region,
   wherein the data region, the first index region and the second index region are included in one logical address.

19. The apparatus of claim 18, wherein the first index region is next to the data region and the second index region is next to the first index region.

* * * * *